US008918097B2

(12) United States Patent
Dillon et al.

(10) Patent No.: US 8,918,097 B2
(45) Date of Patent: Dec. 23, 2014

(54) MANAGING SERVICE IN AN ACCESS NETWORK FOR WIRELESS COMMUNICATION

(75) Inventors: Matt J. Dillon, Boulder, CO (US); Robert W. Delellis, Fort Mill, SC (US)

(73) Assignee: Motorola Mobility LLC, Libertyville, IL (US)

( * ) Notice: Subject to any disclaimer, the term of this patent is extended or adjusted under 35 U.S.C. 154(b) by 815 days.

(21) Appl. No.: 11/946,197

(22) Filed: Nov. 28, 2007

(65) Prior Publication Data

US 2009/0137240 A1 May 28, 2009

(51) Int. Cl.
*H04W 24/00* (2009.01)
*H04W 36/30* (2009.01)
*H04W 76/02* (2009.01)

(52) U.S. Cl.
CPC .............. *H04W 36/30* (2013.01); *H04W 76/02* (2013.01)
USPC ......... 455/423; 455/69; 455/43.4; 455/11.11; 455/515; 455/450; 455/418; 455/458; 455/412.2; 455/446; 340/13.31; 340/7.33; 340/7.52; 340/7.38

(58) Field of Classification Search
USPC .......... 455/456.1, 431, 435.1, 69, 522, 127.1, 455/67.11, 43.4, 11.11; 370/331, 401, 328; 379/399.01; 375/219; 340/435
See application file for complete search history.

(56) References Cited

U.S. PATENT DOCUMENTS

| 5,555,244 | A | | 9/1996 | Guptal et al. |
| 5,771,459 | A | * | 6/1998 | Demery et al. ............... 455/517 |
| 6,137,994 | A | * | 10/2000 | Alterman et al. ............. 455/69 |
| 6,507,739 | B1 | * | 1/2003 | Gross et al. .................... 455/431 |
| 6,714,551 | B1 | * | 3/2004 | Le-Ngoc ....................... 370/401 |
| 6,823,373 | B1 | | 11/2004 | Pancha et al. |
| 6,961,341 | B1 | | 11/2005 | Krishnan |
| 7,139,664 | B2 | | 11/2006 | Kelley et al. |
| 7,155,198 | B2 | | 12/2006 | Kikinis et al. |
| 7,206,840 | B2 | | 4/2007 | Choi et al. |
| 8,131,212 | B2 | * | 3/2012 | Laufer ......................... 455/13.4 |
| 2002/0137457 | A1 | * | 9/2002 | Nivens et al. ................ 455/13.4 |
| 2003/0098773 | A1 | * | 5/2003 | Chakravarty et al. ......... 340/3.1 |
| 2004/0006638 | A1 | | 1/2004 | Oberlander et al. |

(Continued)

FOREIGN PATENT DOCUMENTS

| WO | 0167261 A1 | 9/2001 |
| WO | 0213489 A2 | 2/2002 |
| WO | 0228127 A1 | 4/2002 |

OTHER PUBLICATIONS

Hashim, M.H. et al.: "Wind Influence on Radio Waves Propagating Through Vegetation at 1.8 GHz", IEEE Antennas and Wireless Propagation Letters, vol. 4, 2005, pp. 143-146.

(Continued)

*Primary Examiner* — Joseph Arevalo
(74) *Attorney, Agent, or Firm* — Lerner, David, Littenberg, Krumholz & Mentlik, LLP

(57) ABSTRACT

A method (400, 500) and a system 200 for managing service in an access network (110) for wireless communication. The method can include monitoring at least one environmental condition and, responsive to detecting a change in the environmental condition, adjusting at least one service parameter. The system can include an environmental detector (130) that monitors at least one environmental condition and a processor (202) that, responsive to detecting a change in the environmental condition, adjusts at least one service parameter.

15 Claims, 4 Drawing Sheets

(56) References Cited

U.S. PATENT DOCUMENTS

| | | | |
|---|---|---|---|
| 2004/0014481 A1* | 1/2004 | Riedl | 455/522 |
| 2004/0033780 A1* | 2/2004 | Kelly | 455/11.1 |
| 2004/0126088 A1* | 7/2004 | Oshima | 386/46 |
| 2005/0026618 A1* | 2/2005 | Gehlot et al. | 455/440 |
| 2005/0026625 A1* | 2/2005 | Gehlot et al. | 455/456.1 |
| 2005/0134440 A1* | 6/2005 | Breed | 340/435 |
| 2005/0136928 A1 | 6/2005 | Zaki | |
| 2005/0137786 A1* | 6/2005 | Breed et al. | 701/200 |
| 2005/0151656 A1* | 7/2005 | Yuen | 340/601 |
| 2005/0163155 A1* | 7/2005 | Yang et al. | 370/465 |
| 2005/0212715 A1* | 9/2005 | Saunders | 343/915 |
| 2005/0222771 A1* | 10/2005 | Matsumoto | 702/3 |
| 2006/0261943 A1* | 11/2006 | Chan | 340/539.28 |
| 2007/0038759 A1 | 2/2007 | Hanson et al. | |
| 2007/0058588 A1 | 3/2007 | Fashandi | |
| 2007/0109111 A1* | 5/2007 | Breed et al. | 340/435 |
| 2007/0165835 A1* | 7/2007 | Berkman | 379/399.01 |
| 2007/0217355 A1* | 9/2007 | de La Chapelle et al. | 370/328 |
| 2007/0223938 A1* | 9/2007 | Gervais et al. | 398/188 |
| 2007/0232307 A1 | 10/2007 | Ibrahim et al. | |
| 2007/0293219 A1* | 12/2007 | Rajan | 455/435.1 |
| 2008/0002624 A1* | 1/2008 | Yasumoto | 370/331 |
| 2008/0043870 A1* | 2/2008 | Oshima | 375/260 |
| 2008/0148816 A1* | 6/2008 | Groves | 73/31.01 |
| 2008/0228429 A1* | 9/2008 | Huang et al. | 702/141 |
| 2008/0274690 A1* | 11/2008 | Laufer | 455/13.4 |
| 2008/0299990 A1* | 12/2008 | Knoblach et al. | 455/456.1 |

OTHER PUBLICATIONS

Pelet, E. et al.: "Effect of Wind on Foliage Obstructed Line-of-Sight Channel at 2.5 GHz", IEEE Trans. Broadcasting, vol. 50, No. 3, Sep. 2004, pp. 224-232.

Zhang, Yonghong et al.: "Impact of Wind-Induced Fading on the Capacity of Point-to-Multipoint Fixed Wireless Access Systems", Proc., IWCMC'06, Jul. 3-6, 2006, Vancouver, British Columbia, Canada, pp. 979-984.

Inoue, R.: "Digital mobile communication system designed for nationwide police activities WIDE system", Security Technology, 1996, 30th Annual 1996 International Carnahan Conference, Publication Date: Oct. 2-4, 1996, Abstract.

* cited by examiner

300

| Wind Speed (mph) | Channel Assignment Latency (ms) | Error Rate |
|---|---|---|
| 0-10 | 500 | 1% |
| 10-20 | 250 | 1.5% |
| 20-30 | 100 | 1% |

MANAGING SERVICE IN AN ACCESS NETWORK FOR WIRELESS COMMUNICATION

BACKGROUND OF THE INVENTION

1. Field of the Invention

The present invention generally relates to wireless communication and, more particularly, to managing service in an access network for wireless communication.

2. Background of the Invention

A typical access network for a wireless communication device (hereinafter "communication device") includes access points. Upon a network entry of the communication device, an access point can employ control messages to assign a channel to the communication device. Also upon the network entry, the access point or a plurality of access points may employ other service parameters to improve the network entry of the communication device, including the use of an n-way setup. Typically, in n-way setup, a plurality of access points form connections with the communication device.

In a hand-off of the communication device from a first access point to a second access point, the access points usually employ control messages to facilitate the hand-off. Typically in the hand-off, a base station controller coordinates the hand-off between the access points. Further, the access points may employ other service parameters to improve the hand-off, such as performing a soft hand-off, increasing the number of soft hand-off legs, and adjusting soft hand-off parameters. In a soft hand-off, a first access point typically maintains a connection with the communication device while a second access point forms a connection with the communication device.

It has been demonstrated that there may be a relationship between wind speed and communication failure rates. For example, a correlation has been found between call setup failures and average wind speed. A correlation has also been found between idle base station controller hand-off failures and average wind speed.

SUMMARY OF THE INVENTION

The present invention relates to a method and system for managing service in an access network for wireless communication. The method can include monitoring at least one environmental condition and, responsive to detecting a change in the environmental condition, adjusting at least one service parameter.

The present invention also relates to a system for managing service in an access network for wireless communication. The system can include an environmental detector that monitors at least one environmental condition. The system also can include a processor that, responsive to detecting a change in the environmental condition, adjusts at least one service parameter.

The present invention also relates to a program storage device readable by a machine, tangibly embodying a program of instructions executable by the machine to perform the various steps and/or functions described herein.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The present invention relates to a method and a system for managing service in an access network for wireless communication. In particular, environmental conditions, for example wind speed, can be monitored in one or more geographic regions serviced by the access network. Further, communication service parameters implemented by the access network to manage system behavior can be selected to achieve a desired quality of service based on the environmental conditions. For example, assume that quality of service typically degrades as wind speed increases and quality of service typically improves as wind speed decreases. When an increase in wind speed is detected, the service parameters can be selected to achieve a desired quality of service for the detected wind speed, although greater system resources may be required. Conversely, when the wind speed decreases, the service parameters can be selected to conserve system resources, while still maintaining the desired level of quality of service.

Figure 1:
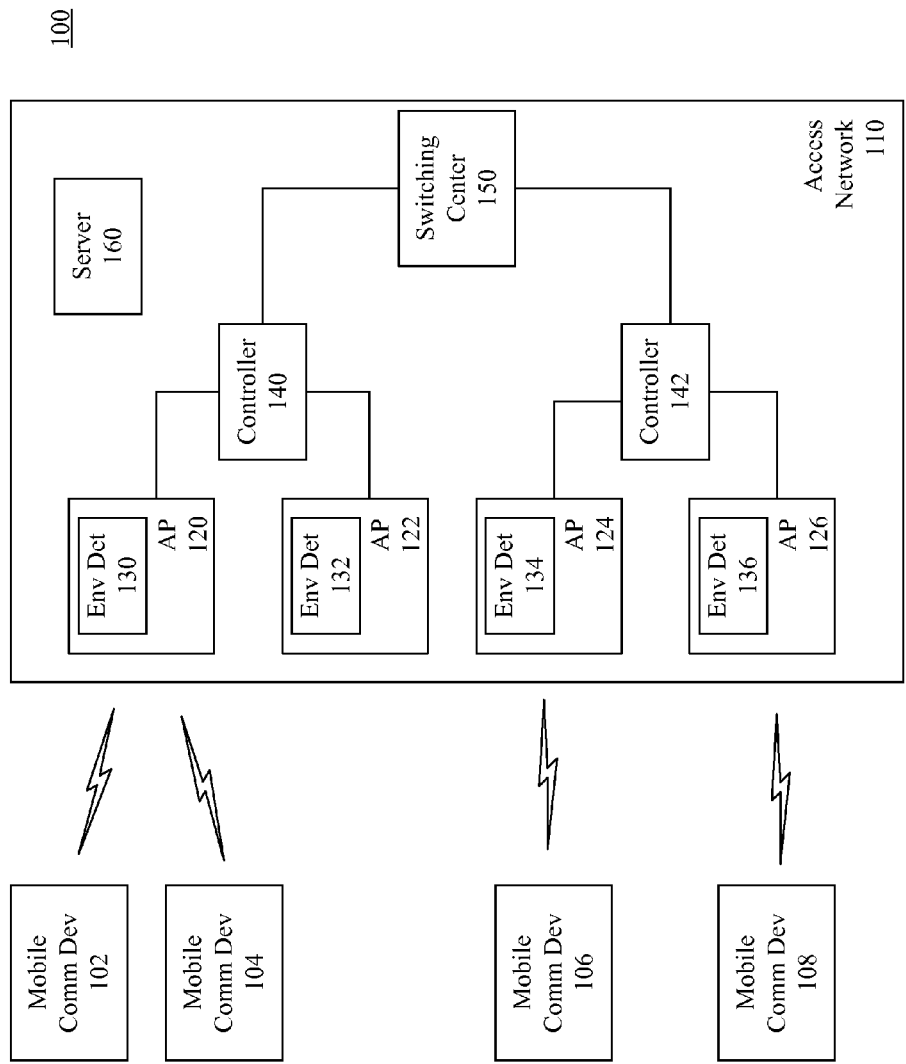
FIG. 1 depicts a communication system that is useful for understanding the present invention.

FIG. 1 depicts a communication system 100 that is useful for understanding the invention. The communication system 100 can be implemented in accordance with one or more applicable wireless communications and air interface standards. Examples of such standards can include, but are not limited to, Institute of Electrical and Electronics Engineers (IEEE) 802 wireless communications, for example, 802.11 and 802.16 (e.g. WiMAX), standards proposed by the Internet Engineering Task Force (IETF) (e.g. RFC 3344—IP Mobility Support for IPv4), the Open Mobile Alliance (OMA), the WiFi Alliance, the 3rd Generation Partnership Project (3GPP), and/or the 3rd Generation Partnership Project 2 (3GPP2) (e.g. EV-DO). The communication system 100 also can implement any of a variety of communication protocols including, but not limited to, GSM, TDMA, CDMA, WCDMA, OFDM, etc. Modifications or deviations from the standards and/or protocols can be made to suitably implement the present invention.

The communication system 100 can include one or more mobile communication devices (hereinafter "communication devices") 102, 104, 106, 108 and an access network 110. The communication devices 102-108 can be, for instance, mobile stations (e.g. mobile telephones, mobile radios, mobile computers, personal digital assistants, or the like), computers, wireless gaming devices, access terminals, subscriber stations, user equipment, or any other devices suitably configured to communicate via a wireless communications network. As such, the communication devices 102-108 can comprise one or more processors/controllers, transceivers, and/or other suitable components.

The access network 110 can include access points (AP's) 120, 122, 124, 126 via which the access network 110 communicates with the communication devices 102-108. Each of the access points 120-126 can include one or more antennas as well as a wireless transceiver. The access points 120-126 may be implemented as base transceiver stations, repeaters, or as any other devices or systems having a suitable wireless transceiver.

The access network 110 also can include one or more environmental detectors 130, 132, 134, 136. The environmental detectors 130-136 can be, for example, wind detectors, rain detectors, humidity detectors, or any other detectors suitable for detecting environmental conditions that may impact a communication system's quality of service. In one arrangement, the environmental detectors 130-136 can be located at respective access points 120-126. For example, if an access point 120-126 includes an antenna tower, the respective environmental detector 130-136 can be located at or near a top of the antenna tower. Similarly, if an access point 120-126 is located on a top of a building, the respective environmental detector 130-136 can also be located on the top of the building. In another arrangement, an environmental detector 130-136 may be located nearby the respective access point 120-126. For example, an environmental detector 130-136 may be located on a tower or on the top of a building that is nearby the respective access point 120-126. In yet another arrangement, an environmental detector 130-136 may be located elsewhere. For example, an environmental detector 130-136 may be located between two access points. In such an arrangement, the environmental detector 130-136 may sense the environmental condition for a plurality of access points.

The access network 110 can also include controllers 140, 142 that control operations of the access points 120-126. The controllers 140, 142 can be, for example, base station controllers, servers, or any other suitable processing devices. The access network 110 further can include a switching center 150 such as a mobile switching center, a public switched telephone network, a switch, a router, or the like.

Figure 2:
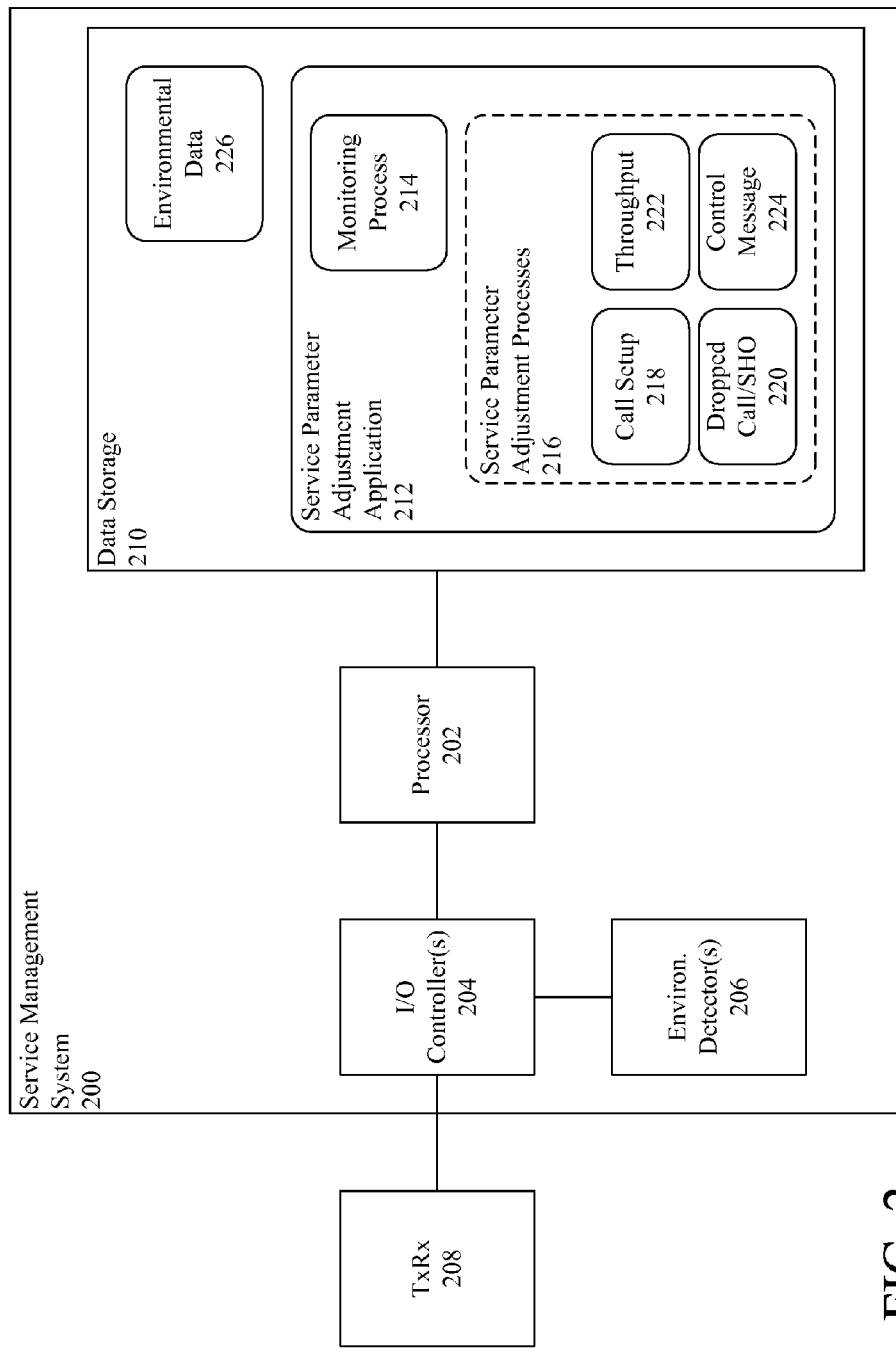
FIG. 2 depicts a system that is useful for understanding the present invention.

Referring to FIG. 2, the access network 110 also can include one or more service management systems 200 that manage communication service in the access network 110. Each service management system can include at least one environmental detector 206, such as the environmental detectors 130-136, and at least one processor 202 that processes environmental data generated by the environmental detectors 206 to adjust communication service parameters implemented in the access network. In particular, the service parameters can be adjusted to correspond to the measured values of the environmental conditions. The service management system 200 may be integrated into each of the access points, one or more of the controllers, the switching center, a server, or located elsewhere in the access network.

The processor 202 can comprise, for example, one or more central processing units (CPUs), one or more digital signal processors (DSPs), one or more application specific integrated circuits (ASICs), one or more programmable logic devices (PLDs), a plurality of discrete components that can cooperate to process data, and/or any other suitable processing device. In an arrangement in which a plurality of such components are provided, the components can be coupled together to perform various processing functions as described herein.

The service management system 200 also can include one or more input/output controllers 204 to manage flow of data between the processor 202 and one or more devices or systems. The input/output controllers 204 can comprise network adapters, communication bus controllers, or any other suitable input/output control devices. Input/output controllers 204 are well known to the skilled artisan.

The input/output controllers 204 can support data communications between the processor 202 and one or more environmental detectors, such as those previously described. The input/output controllers 204 also can support data communications between the processor 202 and one or more external devices, for instance a transceiver 208 of an access point, one or more access points, one or more controllers, etc.

The service management system 200 also can include data storage 210. The data storage 210 can include one or more storage devices, each of which may include, but is not limited to, a magnetic storage medium, an electronic storage medium, an optical storage medium, a magneto-optical storage medium, and/or any other storage medium suitable for storing digital information. In one arrangement, the data storage 210 can be integrated into the processor 202, though this need not be the case.

A service parameter adjustment application (hereinafter "application") 212 can be stored on the data storage or otherwise made accessible to the processor 202. The application can be executed by the processor 202 to implement the methods and processes described herein. For example, the processor 202 can execute the application 212 to implement a monitoring process 214, service parameter adjustment processes 216, and any other suitable processes or functions. The service parameter adjustment processes 216 can include a call setup process 218, a dropped call/soft hand-off (SHO) process 220, a throughput process 222, and a control message process 224.

In operation, environmental data, for example values of wind speed, precipitation rates, humidity, and/or the like, can be measured by the environmental detector(s) 206. The environmental detector(s) 206 can generate corresponding environmental data 226, which can be stored to the data storage 210. The monitoring process 214 can monitor the environmental data 226 to identify one or more metrics that may degrade or improve as one or more environmental conditions change. Such metrics can include, but are not limited to, the number of setup failures, dropped calls, soft hand-off failures, change in throughput, and the like. The monitoring process 214 also can monitor quality of service parameters for the communication system. Such parameters can include, but are not limited to, setup failures, dropped calls, failed hand-offs, packet delay, packet jitter, data throughput, and the like.

As known to those skilled in the art, a setup failure is a failed attempt to establish a connection with a communication device upon network entry. A dropped call may occur when a first access point attempts to hand-off a communication device to a second access point but the second access point fails to establish a connection with the communication device. Such a dropped call may occur in a soft hand-off. In a soft hand-off, the first access point maintains a connection with the communication device while the second access point establishes a connection with the communication device. The connections with the first and second access points may be referred to as soft hand-off legs. A soft hand-off can include establishing soft hand-off legs with two or more access points. A soft hand-off failure occurs when an access point fails to establish a connection with the communication device during an attempted soft hand-off. Changes in throughput can include increases and decreases in data throughput.

By way of example, setup failure rates and dropped call rates may increase as wind speed increases, while the soft hand-off success rate and data throughput may decrease. Other metrics that are sensitive to latency and/or response time of control messages also may be adversely affected by increasing wind speed. Accordingly, when an increase in wind speed is detected, the application 212 can change communication service parameters to compensate.

For example, in response to the monitoring process 214 identifying a change in wind speed, the call setup process 218 can adjust one or more call setup service parameters. New values for such service parameters can be calculated based upon the measured value of the wind speed, or selected from a table that correlates wind speed to one or more optimal service parameters, as will be described. An example of such a service parameter is a channel assignment latency, which is an allowable delay between receiving a channel assignment request from a communication device and responding with a channel assignment that is sent to the communication device.

Further expanding on the present example, when the wind speed is 5 mph, the setup failure rate may typically be 1% when the channel latency is set to 500 ms. If the wind speed increases to 15 mph, the setup failure rate may increase if the channel latency remains at 500 ms. Thus, upon the monitoring process 214 identifying that the wind speed is 15 mph, the call setup process 218 can set the channel latency to a value that will achieve a target failure rate. For example, the channel latency value can be set to 250 ms. If the new channel latency value does not maintain the target setup failure rate, the call setup process 218 can select another value for the channel latency. For instance, the channel latency value can be set to 200 ms.

Another example of a service parameter that the call setup process 218 may adjust can include an n-way setup parameter, which is the number of access points that attempt a call setup with a communication device. Initially, wind speed may be 5 mph, the setup failure rate may be 1%, and the n-way setup parameter may be set to one access point. Upon the monitoring process 214 detecting a wind speed increase to 35 mph, the call setup process 218 can select an n-way setup parameter of two access points. The service management system 200 can coordinate implementation of an n-way call setup with the access points, controllers associated with the access points, or with any other suitable system.

In one arrangement, the call setup process can calculate a new service parameter value based upon the detected environmental condition. For example, a mathematical algorithm may be generated based on recent environmental conditions, and service parameter values required to achieve a desired quality of service when such environmental conditions occur. In one arrangement, the mathematical algorithm can be generated using a least squares fit method. Such method may be applied over an entire range of environmental condition values and corresponding service parameter values. Alternatively, the least squares fit method can be applied over a plurality of ranges of the environmental conditions/service parameter values to generate a plurality of equations, and the mathematical algorithm can include each such equations. The resulting mathematical algorithm can be executed to calculate new service parameter values when environmental conditions change.

In another arrangement, the call setup process 218 can access a table that defines ranges of values for the environmental condition. For each range of the environmental condition, a corresponding value for the service parameter can be defined. In such an arrangement, the call setup process 218 can identify which range of environmental condition values corresponds to the presently measured environmental condition, and select the service parameter value that corresponds to the identified range. The service parameter value also may be adjusted further to achieve a target quality of service.

Figures 3, 4:
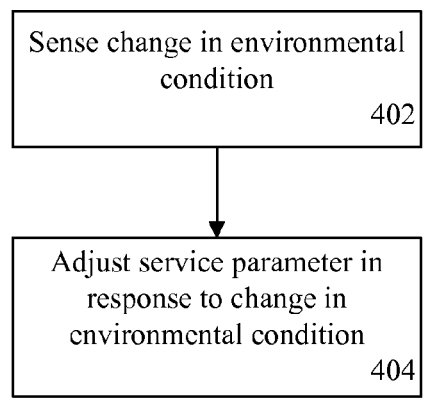
FIG. 3 provides a table that is useful for understanding the present invention.
FIG. 4 depicts a flowchart that is useful for understanding the present invention.

FIG. 3 depicts an exemplary table 300 which may be accessed to determine a new value for channel assignment latency upon a change in wind speed. The table 300 may be accessed, for instance, upon an increase in wind speed from 5 mph to 15 mph being detected. In this example, the 15 mph wind speed falls within the range of 10-20 mph, so a value of 250 ms can be selected for the channel assignment latency with an expectation that the setup failure rate may be 1.5%.

A most recent period of wind may have resulted in the channel assignment latency being set to 250 ms with an expectation of a target error rate of 1%, but instead, an error rate of 1.5% may have been experienced. According to this example, a new value of 200 ms may be returned for the channel assignment latency with an expectation that use of this new value will bring the error rate closer to 1%. The new channel latency value then can be implemented and the actual error rate can be measured. If the error rate does not sufficiently improve, another new value may be returned for the channel assignment latency corresponding to the 10-20 mph wind speed range and the process can repeat. If, however, the error rate does sufficiently improve when the new value for the channel assignment latency is used, the channel assignment latency corresponding to the range of 10-20 mph in the table 300 may be updated with the new value. In addition, the error rate corresponding to the range of 10-20 mph also may be updated with the error rate that is measured when the new channel assignment latency value is implemented.

Referring again to FIG. 2, if a dropped call rate or a soft hand-off failure rate changes with a change in the environmental condition, the monitoring process 214 can communicate an indicator indicating the change to the dropped call/soft hand-off process 220. The dropped call/soft hand-off process 220 can determine a service parameter to adjust and a new value for the service parameter in response to the change in the environmental condition. Service parameters that the dropped call/soft hand-off process 220 may adjust can include, for example, changing a threshold for triggering a hand-off, changing a hand-off to a soft hand-off, adjusting soft hand-off parameters, adjusting latency of soft hand-off control messages, and adjusting response time of soft hand-off control messages. Soft hand-off parameters that the dropped call/soft hand-off process 220 may adjust can include, for instance, the number of soft hand-off legs, a threshold for initiating a soft hand-off, and a soft slope setting.

If a level of data throughput changes with a change in the environmental condition, the monitoring process 214 can communicate a message indicating the change to the data throughput to the throughput process 222. Service parameters that the throughput process 222 may adjust include parameters that reduce packet error rate. Examples of such parameters may include implementing a hybrid automatic repeat request (ARQ), adjusting the hybrid ARQ parameters, implementing a feedback mechanism that employs a channel quality indicator (CQI), and adjusting the feedback mechanism.

A plurality of metrics related to control messages also may change with a change in an environmental condition. In one arrangement, if an error rate associated with a control message changes with a change in the environmental condition, the monitoring process 214 can communicate an indicator that indicates the change to a process that adjusts a service parameter associated with the control message. For example, a change in wind speed may affect an error rate for call setups that may be attributed to channel assignment messages. According to this example, the monitoring process 214 may indicate to the call setup process 218 the change in error rate that is attributed to channel assignment messages. If a plurality of error rates associated with control messages change with a change in the environmental condition, the monitoring process 214 can indicate such changes to a plurality of service adjustment processes. For example, if error rates associated with control messages for call setups and soft hand-offs change with a change in the environmental condition, the monitoring process 214 can communicate corresponding indicators to the call setup process 218 and the dropped call/ soft hand-off process 220.

In another arrangement, if an error rate associated with a control message changes with a change in the environmental condition, the monitoring process 214 can indicate the change to the control message process 224. The control message process 224 can determine a service parameter to adjust and a new value for the service parameter in response to the change in the environmental condition. For example, the control message process 224 may adjust latency or response time for a particular control message in response to the change in the environmental condition. If a plurality of error rates associated with control messages changes with a change in the environmental condition, the monitoring process 214 can also indicate the changes to the control message process 224. The control message process 224 can then adjust service parameters associated with the control messages. For example, the control message process 224 may adjust latency and/or response time for the control messages. Control messages for which the control message process 224 may adjust service parameters can include a channel assignment message, a hand-off message, a soft hand-off message, a page message, or other suitable control messages.

FIG. 4 depicts a flow chart that presents a method 400 that may be performed by service management system 200 in accordance with an embodiment of the present invention. At step 402, the monitoring process can sense a change in an environmental condition measured by the environmental detector. For example, a change in wind speed may be detected. At step 404, a service parameter can be adjusted by the service parameter adjustment application in response to the change in the environmental condition. For example, the call setup process can set the channel latency to a new value, or the control message process can a change control message latency or a response time for a particular control message. Values for such service parameters can be determined by accessing an algorithm with a current environmental condition as an input and receiving a new value for the service parameter in return.

Figure 5:
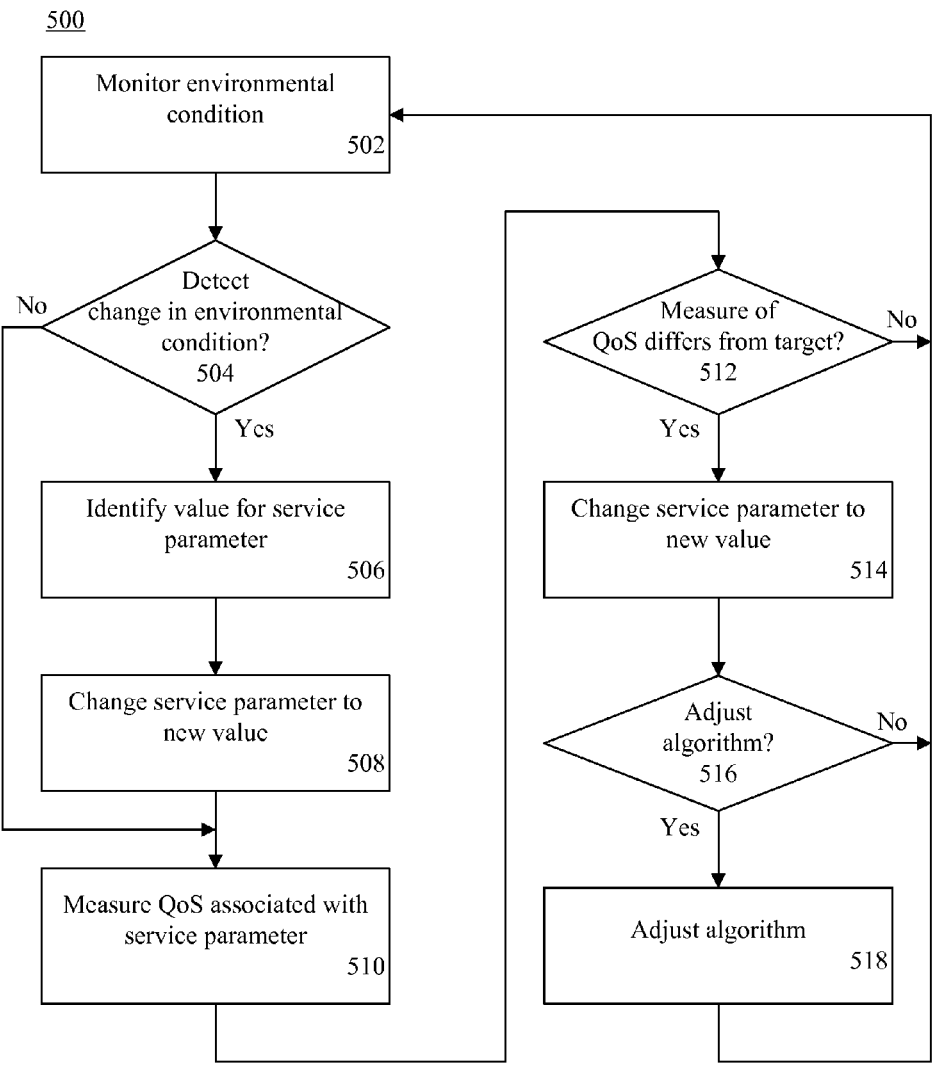
FIG. 5 depicts another flowchart that is useful for understanding the present invention.

FIG. 5 depicts a flow chart that presents a method 500 that may be performed by service management system 200 in accordance with another embodiment of the present invention. At step 502, an environmental condition can be monitored by the monitoring process. For example, wind speed can be monitored. As noted, environmental data pertaining to the environmental condition can be measured by one or more environmental detectors and stored to a data storage that may be accessed by the monitoring process.

Referring to decision box 504, a determination can be made by the service parameter adjustment application whether a change in the environmental condition has been detected. For example, if the environmental condition is wind speed, a wind speed change from 5 mph to 15 mph can be detected by the monitoring process. In no change is detected, the method continues at step 510. If a change is detected then, the method continues at step 506 where, in response to the change in the environmental condition, a new value for a service parameter can be determined by the service parameter adjustment application. For example, if a change in wind speed from 5 to 15 mph is detected, the call setup process can select a new value for channel assignment latency. At step 508, the service parameter can be changed to the new value, for example by the call setup process.

At step 510, a quality of service associated with the service parameter can be measured by the monitoring process. For example, if the service being monitored is call setups, the measure of the quality of service can include the number or frequency/rate of setup or hand-off failures. In another example, if the service being monitored is data throughput, the measure of the quality of service may be a comparison between a current data throughput and a target data throughput. The service parameter adjustment application then may compare the number or frequency/rate of setup or hand-off failures to a failure threshold, or may determine whether the current data throughput is less than the target data throughput by a threshold value or a ratio of the current data throughput to a target data throughput is less than a threshold ratio. Referring to decision box 512, if the measure of the quality of service differs from a target quality of service, for example, when the number or frequency/rate of setup or hand-off failures exceeds the failure threshold or the current data throughput is less than the target data throughput by at least the threshold value, at step 514, the service parameter adjustment application can change the service parameter to a new value. Otherwise, the method returns to step 502. For example, if the measure of the quality of service differs from a target quality of service then the service parameter adjustment application may change the service parameter to a value that decreases a difference between the measured quality of service and the target quality of service. For example, if a channel assignment latency of 250 ms provides an error rate of 1.5% in comparison to a target error rate of 1%, the call setup process can change the channel assignment latency to 200 ms. In another example, if the measured data throughput is lower than the target data throughput, or is lower than the target data throughput by at least a threshold value, the throughput process 222 can increase the data throughput.

Continuing to decision box 516, the service parameter adjustment application makes a determination as to whether to adjust an algorithm that calculates new service parameter values based upon the detected environmental conditions. If so, at decision box 518, the service parameter adjustment application can adjust the algorithm. Otherwise, the method returns to step 502. For example, if channel assignment latency was changed to 200 ms at step 516 while the wind speed remained at 15 mph, the algorithm may be adjusted to return 200 ms for an input wind speed of 15 mph. Such functionality can be integrated into the monitoring process or another suitable process implemented by the service parameter adjustment application.

Adjusting service parameters to provide a target quality of service provides efficient use of resources in an access network. Setting service parameters too stringently may provide a high quality of service but may also waste system resources. Setting service parameters too loosely may result in a low quality of service. For example, an unacceptable rate of call setup failures, call hand-off failures and dropped calls may occur. Data throughput also may suffer.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with an application that, when being loaded and executed, controls the processing system such that it carries out the methods described herein. The present invention also can be embedded in a program storage device readable by a machine, tangibly embodying a program of instructions executable by the machine to perform methods and processes described herein. The present invention also can be embedded in an application product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

This invention can be embodied in other forms without departing from the spirit or essential attributes thereof. Accordingly, reference should be made to the following claims, rather than to the foregoing specification, as indicating the scope of the invention.

What is claimed is:

1. A method of managing service in an access network for wireless communication, comprising:
monitoring a weather condition including at least one of a wind speed, a humidity, and a precipitation rate;
responsive to detecting a change in the weather condition, adjusting at least one wireless communication service parameter selected from a group consisting of a latency of a control message, a response time of the control message, number of access points that attempt a call setup, and a paging repeat parameter;
comparing an actual data throughput to a target data throughput; and
responsive to the actual data throughput being less than the target data throughput by at least a threshold value, adjusting the wireless communication service parameter.

2. The method of claim 1, wherein:
monitoring the weather condition comprises measuring a value associated with the weather condition; and
adjusting the wireless communication service parameter comprises adjusting the wireless communication service parameter to a service parameter value that corresponds to the measured value of the weather condition.

3. The method of claim 2, further comprising:
identifying a range corresponding to the measured value of the weather condition; and
selecting the service parameter value based on the identified range.

4. The method of claim 2, further comprising:
calculating the service parameter value based upon the measured value of the weather condition.

5. The method of claim 1, further comprising:
measuring a quality of service parameter associated with the wireless communication service parameter;
wherein adjusting the wireless communication service parameter comprises changing the wireless communication service parameter to a value that decreases a difference between the measured quality of service and a target quality of service.

6. The method of claim 1, further comprising:
monitoring a rate of failures associated with the wireless communication service parameter; and
responsive to the rate of failures exceeding a threshold value, adjusting the wireless communication service parameter.

7. The method of claim 1, wherein the control message is selected from the group consisting of a channel assignment message, a hand-off message, a soft hand-off message, and a page message.

8. A system for managing service in an access network for wireless communication, comprising:
an environmental detector that monitors a weather condition including at least one of a wind speed, a humidity, and a precipitation rate; and
a processor that, responsive to detecting a change in the weather condition, adjusts at least one wireless communication service parameter selected from a group consisting of a latency of a control message, a response time of the control message, number of access points that attempt a call setup, and a paging repeat parameter,
wherein the processor compares an actual data throughput to a target data throughput and, responsive to the actual data throughput being less than the target data throughput by at least a threshold value, adjusts the wireless communication service parameter.

9. The system of claim 8, wherein the environmental detector comprises at least one of a wind speed detector, a rain detector, and a humidity detector.

10. The system of claim 8, wherein:
the environmental detector measures a value associated with the weather condition; and
the processor adjusts the wireless communication service parameter to a service parameter value that corresponds to the measured value of the weather condition.

11. The system of claim 10, wherein:
the processor identifies a category corresponding to the measured value of the weather condition and selects the service parameter value based on the identified category.

12. The system of claim 10, wherein the processor calculates the service parameter value based upon the measured value of the weather condition.

13. The system of claim 10, wherein the processor measures a quality of service associated with the wireless communication service parameter and changes the wireless communication service parameter to a value that decreases a difference between the measured quality of service and a target quality of service.

14. The system of claim 8, wherein the processor monitors a rate of failures associated with the wireless communication service parameter and, responsive to the rate of failures exceeding a threshold value, adjusts the wireless communication service parameter.

15. A non-transitory program storage device readable by a machine, tangibly embodying a program of instructions executable by the machine to perform a method of managing service in an access network for wireless communication, the method comprising:

monitoring a weather condition including at least one of a wind speed, a humidity, and a precipitation rate;

responsive to detecting a change in the weather condition, adjusting at least one wireless communication service parameter selected from a group consisting of a latency of a control message, a response time of the control message, number of access points that attempt a call setup, and a paging repeat parameter;

comparing an actual data throughput to a target data throughput; and responsive to the actual data throughput being less than the target data throughput by at least a threshold value, adjusting the wireless communication service parameter.

* * * * *